United States Patent
Keller et al.

(10) Patent No.: US 8,838,061 B2
(45) Date of Patent: Sep. 16, 2014

(54) METHOD AND APPARATUS FOR PROVIDING MULTIPARTY PARTICIPATION AND MANAGEMENT FOR A TEXT MESSAGE SESSION

(75) Inventors: Matthew C. Keller, Barrington, IL (US); Jeffrey A. Gilbert, St. Petersburg, FL (US)

(73) Assignee: Motorola Solutions, Inc., Schaumburg, IL (US)

( * ) Notice: Subject to any disclaimer, the term of this patent is extended or adjusted under 35 U.S.C. 154(b) by 193 days.

(21) Appl. No.: 13/332,600

(22) Filed: Dec. 21, 2011

(65) Prior Publication Data

US 2013/0165068 A1 Jun. 27, 2013

(51) Int. Cl.
*H04M 11/04* (2006.01)
(52) U.S. Cl.
USPC ........... 455/404.1; 455/466; 455/521; 379/45
(58) Field of Classification Search
USPC .................. 455/416, 466, 404.1–404.2, 458, 455/517–521; 379/45, 202.01
See application file for complete search history.

(56) References Cited

U.S. PATENT DOCUMENTS

| | | | | |
|---|---|---|---|---|
| 5,894,591 A * | 4/1999 | Tamayo | ........................ | 340/7.5 |
| 6,574,480 B1 * | 6/2003 | Foladare et al. | .............. | 455/458 |
| 6,807,564 B1 * | 10/2004 | Zellner et al. | ................ | 709/206 |
| 7,106,835 B2 * | 9/2006 | Saalsaa | ........................... | 379/45 |
| 7,245,900 B1 * | 7/2007 | Lamb et al. | ................ | 455/404.1 |
| 7,392,290 B1 | 6/2008 | Duffield et al. | | |
| 7,813,570 B2 | 10/2010 | Shen et al. | | |
| 7,929,942 B2 * | 4/2011 | Schefczik et al. | ......... | 455/404.1 |
| 8,005,937 B2 | 8/2011 | Wesley et al. | | |
| 8,027,697 B2 * | 9/2011 | Rhodes et al. | ................ | 455/521 |
| 8,165,560 B2 * | 4/2012 | Stenquist | ................... | 455/404.1 |
| 8,340,630 B1 * | 12/2012 | Ward | ........................ | 455/404.2 |
| 8,351,896 B2 * | 1/2013 | Purnadi et al. | ............. | 455/404.1 |
| 8,401,154 B2 * | 3/2013 | Boni et al. | ...................... | 379/45 |
| 8,538,468 B2 * | 9/2013 | Daly | ............................. | 455/466 |

(Continued)

OTHER PUBLICATIONS

Campbell, B., et al., "Session Initiation Protocol (SIP) Extension for Instant Messaging," Network Working Group, RFC 3428, Dec. 2002.

(Continued)

*Primary Examiner* — Sharad Rampuria
(74) *Attorney, Agent, or Firm* — Kenneth A. Haas

(57) ABSTRACT

A method and apparatus provides for multiparty participation and management in text messaging sessions. The method includes a server establishing a text messaging session, which establishes a media path for exchanging text messages between a caller device and a single device having a device identifier known to the caller device, wherein the session is established in response to a call from the caller device. The server further joins multiple responding devices to the text messaging session, receives text messages from the multiple responding devices, and sends, over the media path to the caller device, a set of text messages based on the text messages received from the multiple responding devices.

18 Claims, 4 Drawing Sheets

(56) References Cited

U.S. PATENT DOCUMENTS

| | | | |
|---|---|---|---|
| 2001/0006889 A1* | 7/2001 | Kraft | 455/412 |
| 2002/0118796 A1* | 8/2002 | Menard et al. | 379/45 |
| 2004/0002350 A1* | 1/2004 | Gopinath et al. | 455/466 |
| 2004/0019701 A1 | 1/2004 | McGee et al. | |
| 2005/0138128 A1 | 6/2005 | Baniel et al. | |
| 2006/0149818 A1 | 7/2006 | Odell et al. | |
| 2007/0003029 A1* | 1/2007 | Vesterinen | 379/88.14 |
| 2008/0304631 A1* | 12/2008 | Vilis et al. | 379/45 |
| 2009/0089371 A1 | 4/2009 | Narang et al. | |
| 2009/0227225 A1* | 9/2009 | Mitchell et al. | 455/404.2 |
| 2010/0003954 A1* | 1/2010 | Greene et al. | 455/404.1 |
| 2010/0158231 A1* | 6/2010 | Newberg et al. | 379/202.01 |
| 2010/0184401 A1* | 7/2010 | Spence | 455/404.2 |
| 2010/0296634 A1* | 11/2010 | Schulzrinne et al. | 379/45 |
| 2011/0064205 A1* | 3/2011 | Boni et al. | 379/45 |
| 2011/0145191 A1 | 6/2011 | Anderson et al. | |
| 2011/0258266 A1* | 10/2011 | Serra et al. | 709/206 |
| 2012/0034897 A1* | 2/2012 | Kreitzer et al. | 455/404.1 |
| 2012/0034938 A1* | 2/2012 | Kreitzer et al. | 455/466 |
| 2013/0072145 A1* | 3/2013 | Dantu | 455/404.1 |
| 2013/0078943 A1* | 3/2013 | Biage et al. | 455/404.2 |
| 2013/0203373 A1* | 8/2013 | Edge | 455/404.2 |

OTHER PUBLICATIONS

Campbell, B., et al., "The Message Session Relay Protocol (MSRP)," Network Working Group, RFC 4975, Sep. 2007.

Jennings, C., et al., "Relay Extensions for the Message Session Relay Protocol (MSRP)," Network Working Group, RFC 4976, Sep. 2007.

Rosenberg, J., et al., "SIP: Session Initiation Protocol," Network Working Group, RFC 3261, Jun. 2002.

Saint-Andre, P., "Extensible Messaging and Presence Protocol (XMPP): Core," Network Working Group, RFC 3920, Oct. 2004.

Saint-Andre, P., "Extensible Messaging and Presence Protocol (XMPP): Instant Messaging and Presence," Network Working Group, RFC 3921, Oct. 2004.

Saint-Andre, P., "Mapping the Extensible Messaging and Presence Protocol (XMPP) to Common Presence and Instant Messaging (CPIM)," Network Working Group, RFC 3922, Oct. 2004.

Saint-Andre, P., "End-to-End Signing and Object Encryption for the Extensible Messaging and Presence Protocol (XMPP)," Network Working Group, RFC 3923, Oct. 2004.

PCT International Search Report Dated Mar. 22, 2013 for Counterpart Application PCT/US2012/069648.

* cited by examiner

METHOD AND APPARATUS FOR PROVIDING MULTIPARTY PARTICIPATION AND MANAGEMENT FOR A TEXT MESSAGE SESSION

FIELD OF THE DISCLOSURE

The present disclosure relates generally to text messaging sessions and more particularly to procedures for managing and coordinating the text messages passed between multiple responding devices and a single caller device.

BACKGROUND

Increasingly, commercial and public-service call centers are becoming text accessible, allowing callers to interact with the centers in a text-based format. The Next Generation 911 (NG911) initiative to update the North American emergency-service infrastructure, for example, is introducing the capability to establish text messaging sessions with callers seeking assistance. The emergency caller would send a text to a short code associated with the relevant emergency service before being routed to the appropriate Public Safety Answering Point (PSAP) and connected to a call operator with the ability to text back. However, use of this texting feature is limited when compared to voice-based calls to a service center.

With a voice-based call to a service center, a second operator, such as a supervisor or a technical specialist, might become an active participant in a call where the operator requires assistance. When the caller finds himself speaking with more than one person, he is able to use auditory clues to distinguish between the two operators to make sense of the call. Each operator speaks in a different voice and makes use of verbal cues so as not to speak over each other. No mechanism currently exists to allow a text message caller to intelligibly receive text messages from multiple responding parties or call operators to coordinate their response to the caller.

Accordingly, there is need of a method and apparatus for providing multiparty participation and management for text messaging sessions.

BRIEF DESCRIPTION OF THE FIGURES

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
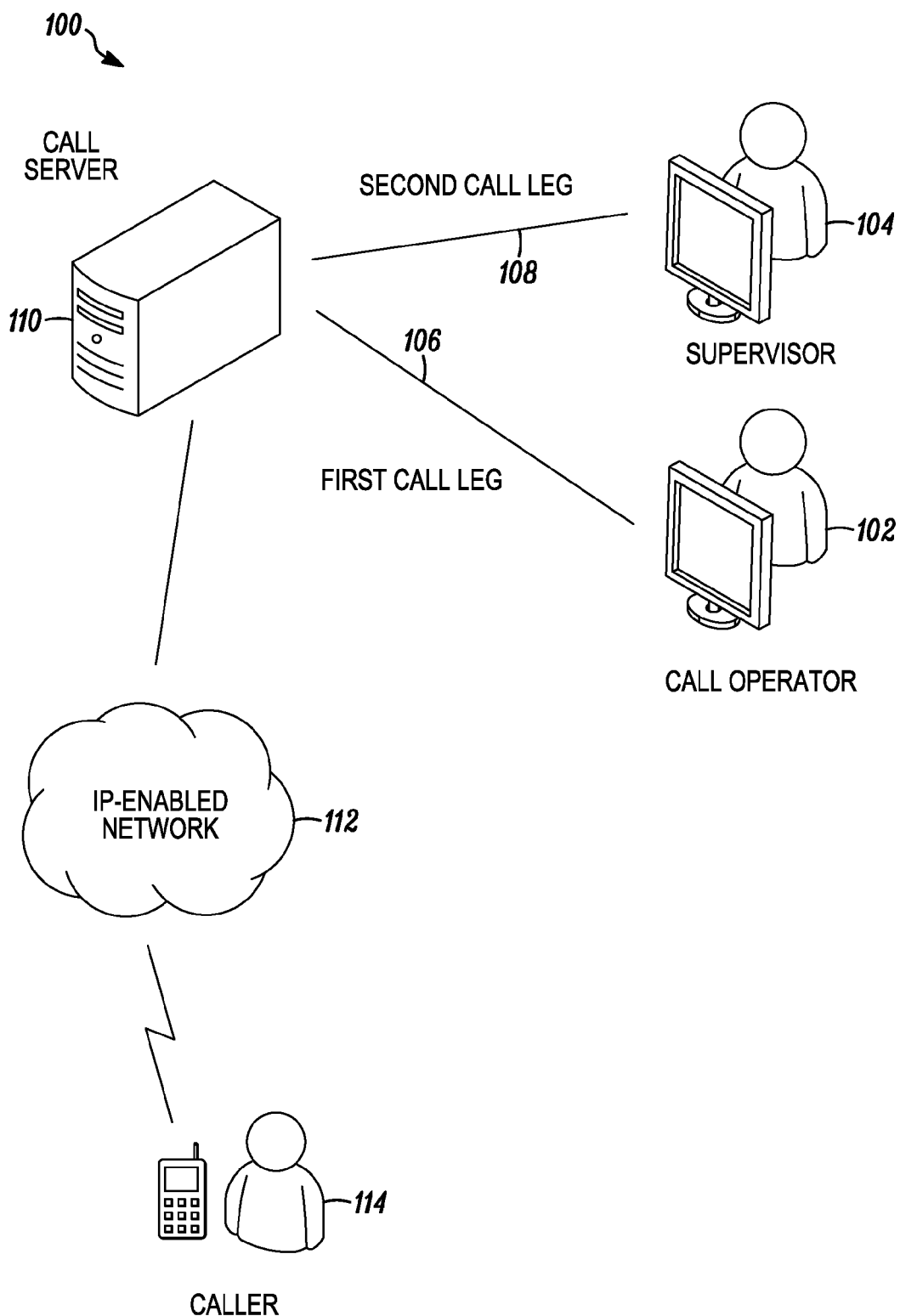
FIG. 1 illustrates a communication system implementing embodiments of the present teachings.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention. In addition, the description and drawings do not necessarily require the order illustrated. It will be further appreciated that certain actions and/or steps may be described or depicted in a particular order of occurrence while those skilled in the art will understand that such specificity with respect to sequence is not actually required.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

Generally speaking, pursuant to the various embodiments, the present disclosure provides a method and apparatus for providing multiparty participation and management for text messaging sessions. In accordance with the teachings herein, a method for managing a text messaging session between a caller device and a plurality of responding devices includes a server establishing a text messaging session, which establishes a media path for exchanging text messages between a caller device and a single device having a device identifier known to the caller device, wherein the session is established in response to a call from the caller device. The method further includes the server joining multiple responding devices to the text messaging session; receiving text messages from the multiple responding devices; and sending, over the media path to the caller device, a set of text messages based on the text messages received from the multiple responding devices.

Further in accordance with the teachings herein, an apparatus for coordinating text messages from a plurality of operator devices to determine a text message to send to an emergency caller device includes a processing device which is adapted to establish an emergency text messaging session, which establishes a media path between the apparatus and the emergency caller device. The processing device is also adapted to establish a call leg to the session for a first and second operator device. The apparatus further includes an interface which receives a first text message from the first operator device and a second text message from the second operator device to which the apparatus applies a set of rules to determine at least one text message which is sent to the emergency caller device from the interface, wherein each text message sent to the emergency caller device is associated with a same identifier.

Also in accordance with the teachings herein, is a non-transient computer-readable storage element with computer-readable code stored thereon for programming a computer to perform a method for managing a text messaging session between a caller device and multiple responding devices. The method includes establishing, in response to a call from the caller device, a text messaging session which establishes a media path for sending text messages between the caller device and a single destination device, and joining the multiple responding devices to the text messaging session. The method further includes receiving text messages from the multiple responding devices and applying a set of rules to the text messages to determine a set of text messages to send to the caller device and sending the set of text messages to the caller device over the established media path, wherein each text message in the set of text messages is associated with the same identifier.

Referring now to the drawings, and in particular FIG. 1, a communication system implementing embodiments in accordance with the present teachings is shown and indicated generally at 100. System 100 comprises a call operator with a communication device 102, a supervisor with a communication device 104, a first call leg 106, a second call leg 108, a call server 110, an Internet Protocol (IP)-enabled network 112, and a caller with a communication device 114. Only a limited number of system elements 102, 104, 106, 108, 110, 112 and 114 are shown for ease of illustration, but additional such elements may be included in the communication system 100. Moreover, other components needed for a commercial embodiment of the system 100 are omitted from the drawing for clarity in describing the enclosed embodiments.

In this illustrative implementation, the system elements 102-114 of communication system 100 are configured to support a text messaging session between the caller 114 and multiple operators 102, 104. A text messaging session is a communication session in which typewritten messages (i.e., text messages) comprised of alphanumeric characters are exchanged over a communications network between session participants. Text messages include messages that are exchanged on a character-by-character basis or as a complete text message comprising multiple characters. Text messaging sessions are distinguished from voice calls in that speech is not encoded in the individual text messages being exchanged. No particular texting protocol is implied with regard to the exchange of text messages, which may be based upon Short Message Service (SMS), Internet Relay Chat (IRC), Instant Messaging (IM), Real-Time Text (RTT), or any other suitable model that allows for the implementation of the teachings found herein. Further, no particular communication network is implied at 112. Only that it be IP-enabled with the ability to route transmitted texts over an internetwork, such as the Internet or other similar network, to their proper destinations. A Global System for Mobile Communications (GSM) network, a Code Division Multiple Access (CDMA) network or an Emergency Services IP Network as defined by the National Emergency Number Association (NENA), for example, each represent an equally-valid network option.

We now turn to a detailed description of the system elements within communication system 100. In general, the call operator device 102, supervisor device 104, call server 110, IP-enabled network 112, and caller device 114 are adapted with functionality in accordance with embodiments of the present disclosure as described in detail below with respect to the remaining figures. Being "adapted" or "configured" means that such elements are implemented using one or more (although not shown) memory devices, network interfaces, and/or processing devices that are operatively coupled. The memory devices, network interfaces, and/or processing devices, when programmed, form the means for these system elements to implement their desired functionality.

The network interfaces are used for passing signaling, also referred to herein as messaging (e.g., messages, packets, datagrams, frames, superframes, and the like), containing control information, voice, or non-voice media between the elements of the system 100. The implementation of the network interface in any particular element depends on the particular type of network, i.e., wired and/or wireless, to which the element is connected. For example, the caller device 114 contains a wireless interface to attach to the IP-enabled network 112, and there may be wired interfaces between the call server 110 and infrastructure devices contained in the IP-enabled network 112. Examples of wired interfaces include Ethernet, T1, USB interfaces, etc.

Where the network supports wireless communications, the network interfaces comprise elements including processing, modulating, and transceiver elements that are operable in accordance with any one or more standard or proprietary wireless interfaces. Some of the functionality of the processing, modulating, and transceiver elements may be performed by means of the processing device through programmed logic such as software applications or firmware stored on the memory device of the system element or through hardware.

Figure 2:
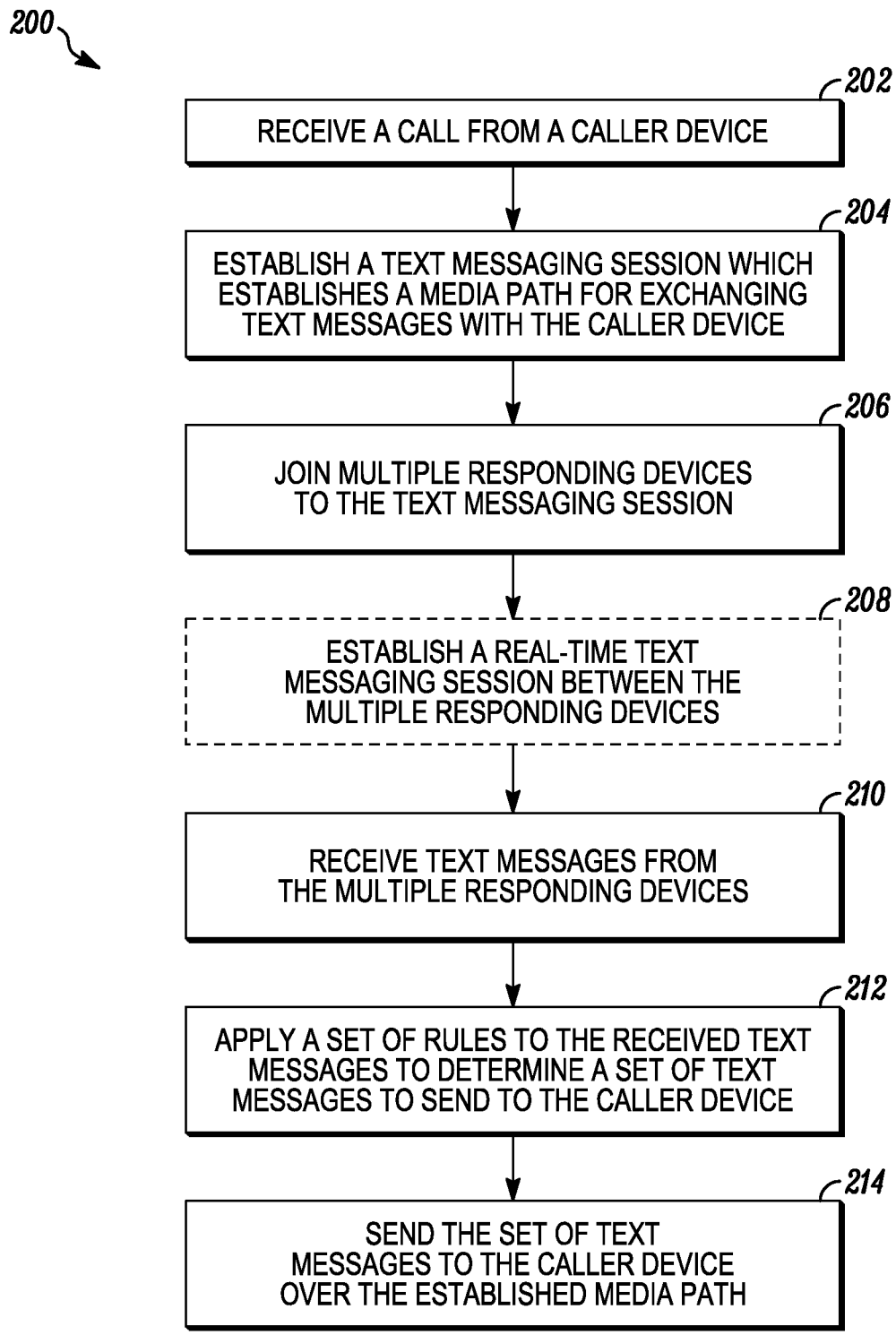
FIG. 2 is a logical flowchart illustrating the establishment and management of a multiparty text messaging session in accordance with some embodiments.

The processing devices utilized by the elements of system 100 may be partially implemented in hardware and, thereby, programmed with software or firmware logic or code for performing functionality described by reference to FIGS. 2-4; and/or the processing devices may be completely implemented in hardware, for example, as a state machine or ASIC (application specific integrated circuit). The memory implemented by these system elements can include short-term and/or long-term storage of various information needed for the functioning of the respective elements. The memory may further store software or firmware for programming the processing device with the logic or code needed to perform its functionality.

Turning back again to the detailed description of the system elements, the call server 110, also interchangeably referred to herein as the "server" or "apparatus," manages the methods described throughout these teachings for controlling text messaging sessions and providing for multiparty participation. To accomplish this, the server 110 comprises a processing device (not shown), interchangeably referred to herein as a "computer," which may be programmed via a non-transient computer-readable storage element having computer-readable code stored thereon. The server 110 also comprises one or more interfaces (not shown) by which it sends and receives messages. For messages received from the caller 114, the server 110 serves as the terminal point.

The caller device 114 is a communication device with text messaging capability that is used by a caller, also indicated by 114, to place a voice or text call to a call center. Where the intent is clear from context, the terms "caller device" and "caller" may be used interchangeably. The caller device 114 may be any one of a number of devices commonly referred to in the art as mobile devices, access devices, access terminals, mobile stations, mobile subscriber units, subscriber units, user devices, and the like, which can be radios, mobile phones, mobile data terminals, Personal Digital Assistants (PDAs), laptops, desktop computers, two-way radios, cell phones, or any other type of electronic device capable of exchanging text messages with similar devices located at a call center.

Call-center communication devices are shown at 102 and 104. In this embodiment, they represent a call operator 102 and a supervisor 104, each at a text-capable terminal designed to exchange text messages with the caller 114 and each other. Throughout these teachings, the call operator 102 and the supervisor 104 may be collectively referred to as operators, and where the intended meaning is clear from context, may also be referred to as "operator devices" or "responding devices." The devices used by the operators to send text messages may comprise any of the devices listed in the previous paragraph in reference to the caller and also typically have capabilities of exchanging messaging containing voice media with the caller device.

During a text messaging session, the responding devices at 102 and 104 are connected to the server 110 by call legs 106, 108. This allows the server 110 to coordinate messages typed by the operators 102, 104 and pass them along to the caller 114 over a media path established through the IP-enabled network 112. A "media path," as used herein, means any logical communication link between entities (at endpoints of the communication link) which allows those entities to exchange text-based messages (or other media). The media path may include intermediary devices such as routers, and the like, to facilitate exchange or delivery of the media between the endpoint entities. Where an endpoint to a media path is an infrastructure device such as the call server 110 or another infrastructure device within the IP-enabled network 106, the endpoint is referred to herein as a "terminal point" or "termination point" for distinction. Subscriber or operator endpoints such as 114 and 102 and 104, respectively, are referred to simply as endpoints.

In one possible embodiment, the IP-enabled network at 112 might be an Emergency Services IP-Enabled Network (ESInet) containing Next Generation 911 (NG911) call routing applications that route an emergency text call placed by an emergency caller 114 to an NG911 Customer Premise Equipment (CPE) server 110 located at a Public Safety Answering Point (PSAP) where emergency operators 102, 104 are waiting to take the call. In another possible embodiment, the caller 114 texts a call center for customer support where an operator 102 and a technical specialist 104 offer instruction or specific product information.

We now turn to a detailed description of the functionality of the system 100 elements in accordance with the teachings herein and by reference to the remaining figures. FIG. 2 is a logical flow diagram illustrating a method 200 performed by the call server 110 for establishing a text messaging session between a caller 114 and multiple operators 102, 104 where text messages received from the operators 102, 104 are processed by a processing device associated with the server 110 before being sent to the caller 114. More particularly, FIG. 2 shows the server 110 receiving, at 202, a call from a caller device 114. The call from the caller device 114 may be a voice- or text-based communication which signals the server 110 associated with a call center that the caller 114 wishes to establish a text-based communication session with the call center. The session may be set up, and also taken down, by any suitable proprietary or standard session management protocol. One example is Session Initiation Protocol (SIP) which is a particular session management protocol defined in Request for Comments (RFC) 3261 dated June 2002 (and any subsequent revisions) as published by the Internet Engineering Task Force (IETF) standards organization.

In response to the call from the caller device 114, the server 110 begins or establishes (204) a text messaging session, e.g., using SIP, which establishes a media path (i.e., media channel) over the IP-enabled network 106 for the exchange of text messages between the caller device 114 and a single destination device. The IP address or a port associated with either the caller device or the destination device might be used to make the session uniquely identifiable. The destination device serves as the initial infrastructure termination point (i.e., a terminal point) for the media path on the call-center side, where the server 110 is typically located. Generally, this termination point is taken to be at the server 110, but sometimes the functionality of the server 110 may be distributed across multiple physical devices. For example, a media gateway and a call-signaling gateway associated with the text messaging session may reside on different platforms. For ease of explanation, it is assumed for this embodiment that the destination device and the server 110 are collocated.

The call legs 106, 108 (also referred to herein as "session legs") established by the server 110 to the responding devices 102, 104 are logical connections by which the responding devices 102, 104 are joined (206) to the text messaging session. The responding devices 102, 104 may be joined to the text messaging session in any order, or also simultaneously. Joining is the process by which a responding device is brought into an active session so that it may exchange media with other devices joined to the session. A responding device leaves a session when it is disassociated from it, usually in response to user input, and its logical connection to the session is dissolved so that the responding device no longer retains its ability to exchange media with those devices that remain joined to the session. When a responding device joins or leaves a session, the associated call leg is respectively set up or taken down using session management protocol signaling, such as SIP, for example.

At 208, the server 110 establishes a real-time text messaging session between those responding devices 102, 104 that are joined to the call with the caller device 114. This is an optional feature by which, when implemented, the responding devices 102, 104 are automatically put into an additional text messaging session with each other as they are joined to the session which includes the caller device 114. The additional session is an automatically established session in that the responding devices 102, 104 are joined to it without any input from the responding devices reflecting a conscious decision to join.

The additional session is a real-time text messaging session in that the server receives and transmits (i.e., sends or signals) real-time content of a text message being written (i.e., typed) by an operator to the other operators in real time, as it is being keyed into the operator device. For real-time text messaging, any suitable protocol can be used, such as Real-Time Text (RTT) as specified by International Telecommunication Union (ITU) Recommendation F.703 approved in November of 2000 and any subsequent revisions. The purpose of this additional real-time session is to allow each operator to see the contents of the other messages, being typed by other operators, in real time (meaning substantially at or near the time the message is keyed), before any message is sent to the caller 114. This helps eliminate repeated or conflicting messages that might otherwise confuse the caller 114. Seeing that one operator is already in the process of asking an emergency caller 114 for his present location, for example, a second operator need not repeat the question.

Where multiple text messages are received (210) at the server 110 in a short period of time, each from a different responding device, the messages are processed before a response is sent to the caller 114. This again is to minimize caller confusion and to maintain the appearance (to the caller and the caller device) that the caller 114 is only exchanging texts with a single operator. Processing the text messages can be something as simple as appending later-received messages to a first, or it can involve the application of an algorithm which applies a set of rules to the messages. As used throughout these teachings, "a set" is defined to include one or more elements. Where a set of rules is applied (212) to multiple text messages received from different responding devices, a set of text messages is created (212) that is sent (214) to the caller device 114 over the established media path.

The content of the set of text messages is related to the contents of the original text messages that are processed to determine the set. By basing the set of text messages on the content of at least one of the original text messages received from the operators, the intent of the operators 102, 104 is still communicated to the caller 114. A set of text messages is based on received text messages when either some of the content of the received text messages is incorporated into the set of text messages or when the content of the received text messages affects the content of the set of text messages. Moreover, in an embodiment, to maintain the appearance (to the caller) that the caller is only exchanging texts with a single operator, all of the text messages sent to the caller from the multiple operators are associated with the same identifier. For example, a caller device receives messages associated with a single device identifier (i.e., of the terminal point) known to the caller device. In another example, each text message sent to the caller device (even though generated by different operators using their respective responding devices) is associated with the same service identifier, which is displayed to the caller.

In a particular embodiment, the server 110 determines the elapsed time that has passed for every text message it receives from the responding devices 102, 104 as measured from the receipt of the previous such message. Where the server 110 determines that the time interval between two consecutive messages is shorter than a threshold time interval, the server 110 processes the messages by applying a set of rules to arrive at a set of text messages (including one or both of the two consecutive messages) to send the caller device 114. The threshold time interval may be set to any fixed value, or it may even be a variable whose value is determined dynamically while the text messaging session with the caller 114 is in progress.

Possible rules that could be applied where a short time interval (meaning less than the threshold time interval) triggers the processing of a pair (or more) of text messages might include sending only the first text message to the caller 114 and gating the second. The second operator is then alerted that his or her message was not sent. Where it is important that a message not be gated, an operator can indicate an override-drop status, whereby the server 110 sends the message, even if it is received within the threshold time interval of the previous message. Alternatively, the later-received message may be held by the server 110 for an amount of time equivalent to a specified delay time interval before it is sent to the caller device 114. In this way, the caller 114 does not receive a series of bunched-up messages and the text-based "conversation" seems more natural to the caller 114. As with the threshold time interval, the delay time interval may be assigned a value in a number of different ways.

As a further example of a rule, the decision on whether or not to send the later-received text message to the caller device 114 may be predicated or based upon the role of the operator who is sending the message. Where a supervisor is sending the message, for instance, the message may be allowed to pass without being gated or delayed. By contrast, where the message is being sent by an operator designated as a trainee, the message may be dropped by the server 110 in favor of a message sent by an operator who holds more seniority.

In an alternate embodiment, at least one rule within the set of rules may also be applied to consecutive text messages received at the server 110 over a time interval that exceeds the threshold time interval. More particularly, applying the set of rules to the text messages received from multiple responding devices may comprise applying a rule that dictates that when a time interval between two consecutive messages exceeds the threshold time interval, the server simply forwards each message to the caller device without any further processing. In this way, the set of rules allows for the set of text messages sent to the caller device to include text messages sent by the responding devices 102, 104 that lack "proximity" to one another and that were simply forwarded by the server 110 without any further processing.

Once a set of text messages has been determined, it is sent (214) by the server 110 over the media path that has been established to the caller device 114. As mentioned earlier, the set of messages can be associated with a device identifier that identifies to the caller device 114 that the set of messages was sent by a single device, namely the device holding that identifier, and more particularly the destination device or terminal point at the other end of the media path. For example, the device identifier might indicate a port on the server 110, or may even specify a different destination device altogether where the functionality of the server 110 has been distributed as previously indicated. Moreover, the set of messages might even include a service-center identifier associated with the set of text messages sent (214) to the caller device, which is displayed to the caller, thereby indicating to the caller 114 that the set of text messages was received from a specifically identified calling center. Where the text messaging session is an emergency text messaging session established in response to an emergency call from the caller device, the service-center identifier can be an emergency service identifier that identifies the specific Public Safety Answering Point (PSAP) that responded to the call.

Figure 3:
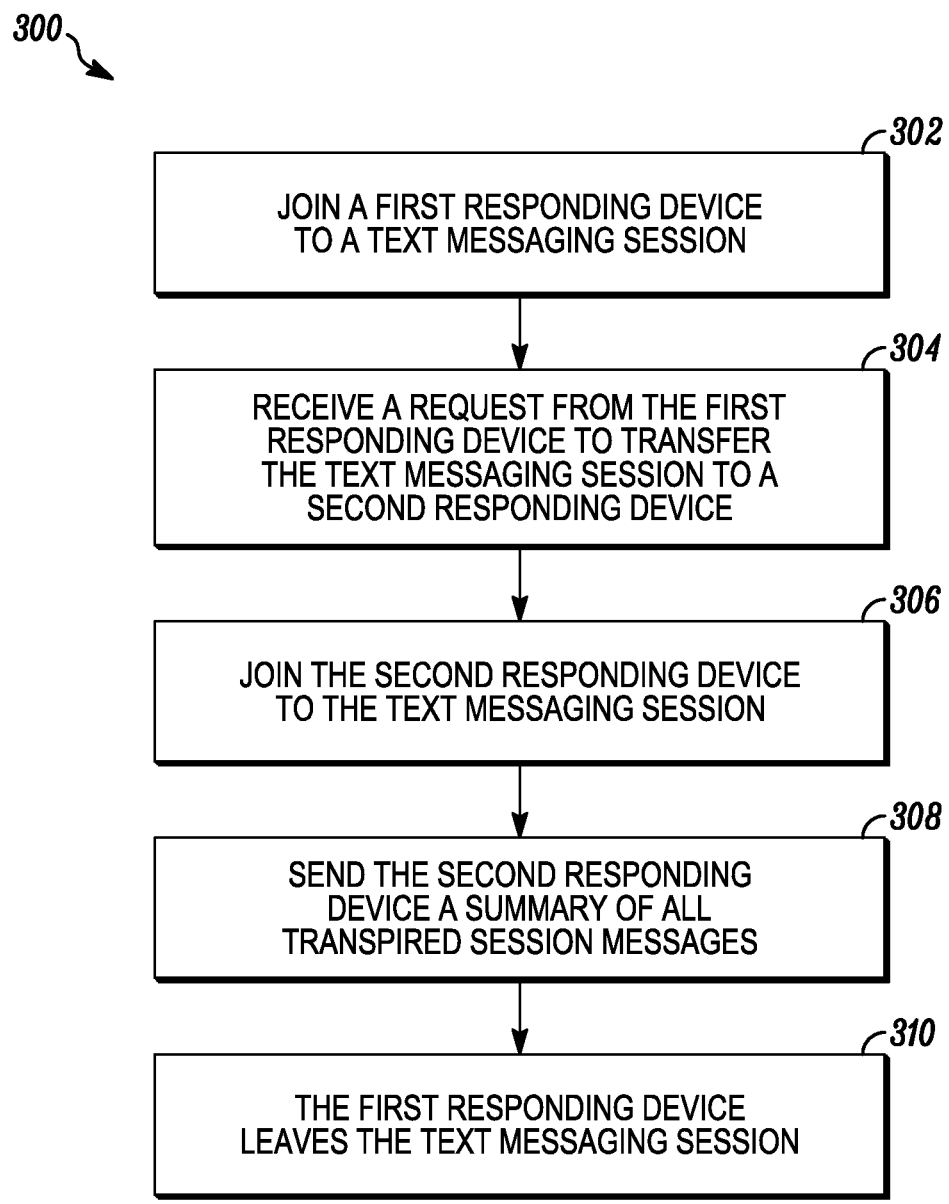
FIG. 3 is a logical flowchart illustrating the transfer of a multiparty text messaging session from one operator to another in accordance with some embodiments.

Turning now to FIG. 3, a logical flow diagram is shown illustrating a method 300 performed by the server 110 for transferring a text call from one operator to another, in accordance with another embodiment of the present teachings. Particularly, FIG. 3 shows the server 110 joining the responding device used by a first operator 102 to a text messaging session, at 302. At a later time, the first operator 102 sends (304) a request to the server 110 to transfer the text messaging call to a second operator 104. The second operator 104 is joined to the session, at 306, after which a summary of the text messages exchanged between the first operator 102 and the caller 114 is sent (308) to the second operator 104.

The summary of text messages exchanged may be a full or partial transcript of the texts that were sent and received by the first operator 102 and caller 114 that covers some or all of the call history up to the transfer point. In this way, the summary contains the content of at least one of the exchanged messages. As used here, the "content" of a message can be either a verbatim portion of the message or it can be language based on the original language of the message that captures the intended meaning of that message. The summary, which may be created or generated by either the server 110 or the responding device used by the first operator 102, serves to bring the second operator 104 up to speed so that he or she may handle the call effectively. Where only a partial transcript is provided, the second operator may request the remaining portion. At 310, the first operator 102 leaves the text messaging session and the transfer is completed.

Where 304 is a request from the first operator 102 to join a second operator 104 to the call, 302-308 suggest a method by which a second operator 104 may be brought into a call without a full transfer taking place. Alternatively, a second operator 104, such as a supervisor, may proactively join the text messaging session without a request being received by the server 110 from the first operator 102. In either case, the second operator 104 receives a summary of the text messages that were exchanged prior to him or her being joined to the text messaging session. Moreover, it is worth reiterating that the text messages sent by both the first and the second operator (even though at some instances in time the operators devices were not simultaneously joined to the session), are sent over the same media path to the caller device and are associated with the same identifier to maintain the appearance to the caller that these messages were sent from the same operator.

Figure 4:
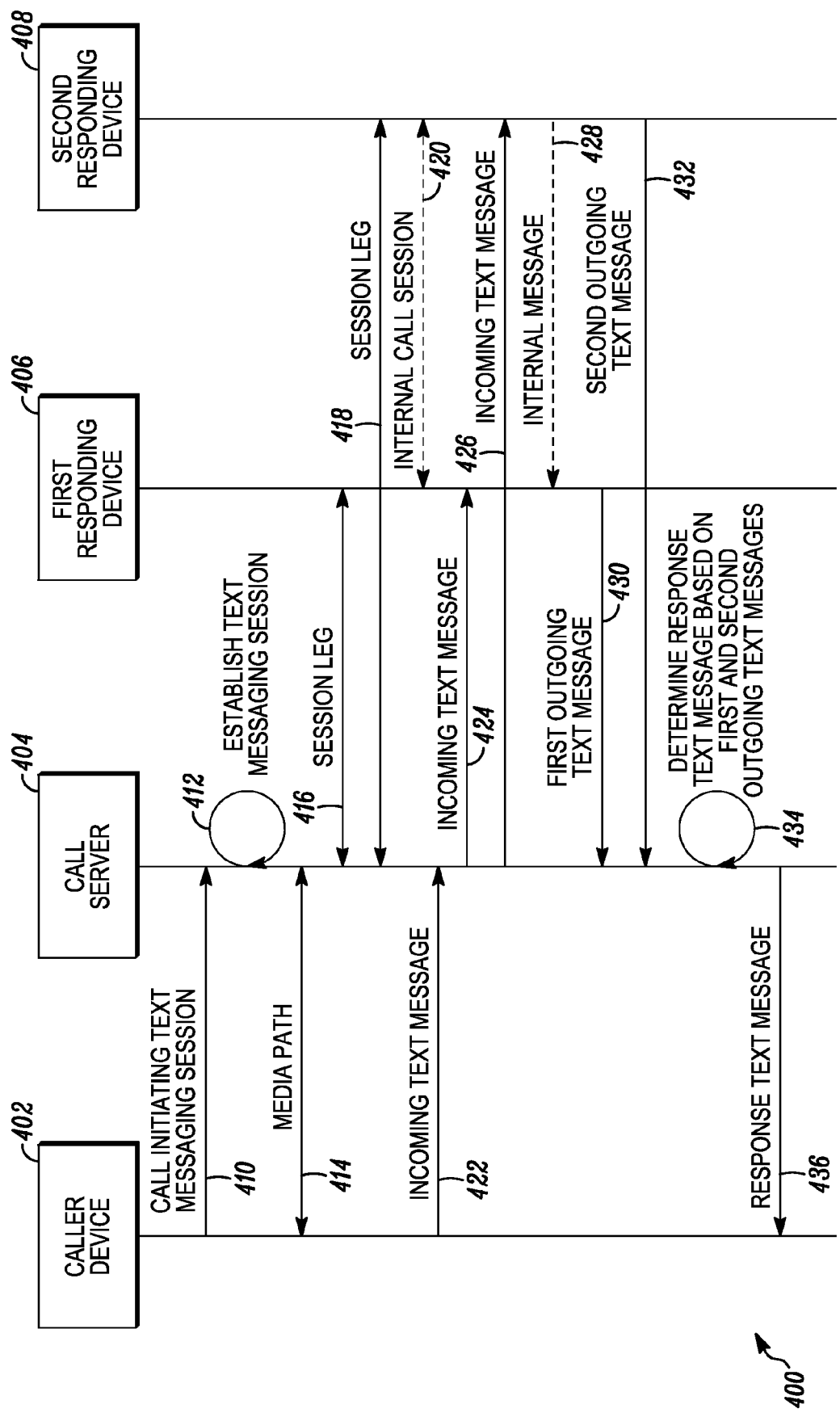
FIG. 4 is a message sequence diagram illustrating the setup and use of a multiparty text messaging session and an internal communication session in accordance with an embodiment of the present teachings.

FIG. 4 is a message sequence diagram illustrating the setup and management of a text messaging session by a call server 404 between a caller device 402 and multiple responding devices 406, 408, including the establishment of an internal communication session. Control signaling for session establishment might implement SIP. Once the session is established, a different set of protocols is used for the flow of media traffic between the caller device and the responding devices, such as RTT, Extensible Messaging and Presence Protocol (XMPP), as defined in Engineering Task Force (IETF) Requests for Comments (RFCs) 3920-3923 approved in October 2004, or Session Initiation Protocol for Instant Messaging and Presence Leveraging Extensions (SIMPLE), a SIP-based suite of standards for instant messaging as defined by IETF RFCs including, but not limited to RFC 3428, dated December 2002 (and any subsequent revisions), and RFCs 4975 and 4976, dated September 2007 (and any subsequent revisions).

More particularly, FIG. 4 shows a call 410 placed by the caller 402 to a call center which signals the call server 404 to initiate (412) a text messaging session, for example using SIP signaling (not shown). As a consequence of establishing the text messaging session, a media path 414 for the exchange of text messages is established between the caller device 402 and the terminating point on the call-center side, which is shown as the server 404 but could also be another destination device, as indicated above with reference to FIG. 2. The first and second responding devices 406, 408 are joined to the call (e.g., using SIP signaling) with the establishment of session legs at 416 and 418, respectively. Once the text messaging session is set up, it allows for text messages to be exchanged between the caller device 402 and the responding devices 406, 408 (over the media path 414) either as they are typed in a real-time format, or after they are written in a format that represents the SMS style or text message exchange, depending on the text messaging protocol used by the devices.

Further, where the text messaging session is a real-time text messaging session, a supervisor (e.g., operator 408) could prevent or block a first operator 406 from sending a text message to the caller device 402. For example, this is accomplished by the supervisor 408 depressing a button on his user interface to indicate to the server 404 to stop the transmission of the text message from the first operator 406. This results in a visual indication being displayed on the interfaces of all operators. In one embodiment, the indication to the server 404 causes the server 404 to prevent the transmission of all text messages from the first operator 406 until receiving a subsequent indication from the supervisor 408 to resume allowing text messages to be sent from the first operator 406 to the caller device 402.

In addition to the text messaging session, an internal chat (call) session 420 may also be set up between just the responding devices 406, 408 for exchanging internal messages including voice or data (e.g., text) messages. This internal call session 420 could be set up automatically by the server 110 when the text messaging session with the caller 402 was established or established at the request of one of the responding devices, but it is different from the additional real-time text messaging session indicated above with reference to FIG. 2.

The real-time text messaging session allows each operator to see the text messages other operators intend to send the caller 402. By contrast, the internal chat session 420 allows the operators 406, 408 to communicate with each other by exchanging voice or text messages 428 that are not intended for the caller 402. This allows the operators 406, 408 to coordinate on anything related to responding to the caller 402 including, but not limited to, coordinating one or both of (i.e., at least one of) content or sending of the text messages from the multiple responding devices 406, 408. Internal messages for the internal chat session can be routed through the server 404, or may be passed directly between responding devices 406, 408, as shown at 428. Moreover, the internal chat session is generally a real-time session that allows each operator to exchange messages as the sender of the message inputs or speaks the content of the message into his responding device.

As an illustrative example, while operator 406 is texting the caller 402 using the text messaging session, operator 408 might catch a mistake while the additional real-time session is putting operator 406's text on operator 408's display as it is being typed. Operator 408 can then use the internal chat session 420 to alert operator 406 to the mistake, which can then be corrected before the typewritten message is finished and sent to the caller 402. Alternatively, operator 408 can block the transmission of the message being typed by operator 406, as indicated above.

Incoming text messages 422 sent over the media path 414 by the caller device 402 are received by the call server 404 and duplicated. Accordingly, copies of the messages are then sent to each responding device, using a suitable messaging protocol such as XMPP, as shown at 424 and 426. Where operator 408 is aware that operator 406 needs additional information to properly interpret the caller's message, operator 408 may use the internal communication channel 420 to send (428) that information, which operator 406 can make use of before responding to the caller 402, at 430. At 432, operator 408 also responds to the caller, and the responses from both operators are received at the call server 404 within a short time interval. Where two or more operators are each responding to a caller, the internal chat session 420 provides them with the opportunity to coordinate their responses before sending them. From the responses sent at 430 and 432, the call server 404 applies a set of rules to determine (434) a set of one or more text messages which are based on those responses, as described above with reference to FIG. 2. The set of text messages is then sent to the caller device, at 436.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has," "having," "includes," "including," "contains," "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a," "has . . . , a," "includes . . . a," or "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially," "essentially," "approximately," "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium (i.e., element) having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

We claim:

1. A method, performed by a server, for managing a text messaging session between a caller device and a plurality of responding devices, the method comprising:
    establishing the text messaging session, which establishes a media path for exchanging text messages between the caller device and a single device having a device identifier known to the caller device, wherein the session is established in response to a call from the caller device;
    joining multiple responding devices to the text messaging session,
    establishing a real-time text messaging session between the multiple responding devices wherein each responding device sees in real time contents of the other responding device's text messages being typed before any text message is sent to the caller device;
    receiving text messages from the multiple responding devices;
    sending, over the media path to the caller device, a set of text messages based on the text messages received from the multiple responding devices;
    wherein the multiple responding devices comprises a first responding device that sends a first text message at a first time and a second responding device that sends a second text message at a second and subsequent time, wherein sending the set of text messages comprises:
    determining that a time interval between the first and second times is shorter than a threshold time interval; and
    applying at least one rule to determine at least one of the first or the second text messages to send to the caller device;
    wherein the at least one rule comprises at least one of:
    sending the first text message, and providing an indication to the second responding device that the second text message was not sent;
    sending the second text message to the caller device when the second responding device has assigned an override-drop status to the second text message;
    determining a role of an operator using the second responding device, and determining, based on the role, whether to send the second text message; or
    sending the first text message and delaying sending the second text message to the caller device by a delay time interval.

2. The method of claim 1, wherein the multiple responding devices comprise a first responding device and a second responding device that joined the text messaging session subsequently to the first responding device joining the text messaging session, and wherein the first responding device leaves the text messaging session, the method further comprising:
    sending, to the second responding device, a summary of text messages exchanged between the first responding device and the caller device prior to the second responding device joining the text messaging session.

3. The method of claim 1, wherein the multiple responding devices comprise a first and a second responding device, wherein the second responding device joins the session after the first responding device, the method further comprising sending, to the second responding device, content of at least one text message exchanged between the first responding device and the caller device.

4. The method of claim 1, wherein the multiple responding devices comprises a first responding device that sends a first text message and a second responding device that sends a second text message, the method further comprising:
receiving real-time content of the first text message, and sending the real-time content of the first text message to the second responding device as the content is keyed into the first responding device; and
receiving real-time content of the second text message, and sending the real-time content of the second text message to the first responding device as the content is keyed into the second responding device.

5. The method of claim 4 further comprising receiving an indication from the second responding device to prevent the first text message from being sent to the caller device.

6. The method of claim 1, wherein an internal chat session is established between the multiple responding devices for exchanging internal messages between the multiple responding devices in order to coordinate at least one of content or sending of the text messages from the multiple responding devices.

7. The method of claim 1, wherein the set of text messages comprises a first text message from a first responding device of the multiple responding devices and a second text message from a second responding device of the multiple responding devices, wherein both the first and the second text messages are associated with a same identifier.

8. The method of claim 7:
wherein the text messaging session is an emergency text messaging session established in response to an emergency call from the caller device; and
wherein the identifier associated with the first and the second text messages is an emergency service identifier.

9. The method of claim 1 further comprising:
receiving a text message over the media path from the caller device; and
sending the text message to each of the multiple responding devices.

10. The method of claim 1, wherein the media path is established over an Internet Protocol (IP)-enabled network.

11. The method of claim 10, wherein the media path is established using Session Initiation Protocol (SIP) messaging.

12. An apparatus for coordinating text messages from a plurality of operator devices to determine a text message to send to an emergency caller device, the apparatus comprising:
a processing device adapted to establish an emergency text messaging session, which establishes a media path between the apparatus and the emergency caller device, and adapted to establish a call leg to the session for each of a first operator device and a second operator device; and
an interface adapted to receive a first text message from the first operator device and a second text message from the second operator device and provide real-time messaging between the first and the second operators such that each operator device sees contents of the other operator's text messages being typed in real time before any text message is sent to the emergency caller device;
wherein the processing device is further adapted to apply a set of rules to the first and the second text messages to determine at least one text message to send to the emergency caller device; and
wherein the interface is further adapted to send the at least one text message to the emergency caller device, wherein each text message sent to the emergency caller device is associated with a same identifier;
wherein the set of rules comprises at least one of:
a rule to send a first text message from a first responding device, and provide an indication to a second responding device that a second text message was not sent;
a rule to send a second text message from the second responding device when the second responding device has assigned an override-drop status to the second text message;
a rule to send either the first or the second text message based on a role of the first or the second responding device; or
a rule to send the first text message delay sending the second text message by a delay time interval.

13. The apparatus of claim 12, wherein content of the first and second text messages is received into the interface in real time as the content is typed into the first and second operator devices, wherein the interface is further adapted to:
send the content of the first text message in real time to the second operator device as the content of the first text message is typed into the first operator device; and
send the content of the second text message in real time to the first operator device as the content of the second text message is typed into the second operator device.

14. The apparatus of claim 12, wherein the apparatus is a Next Generation 911 (NG911) Customer premise Equipment (CPE).

15. A non-transient computer-readable storage element having computer-readable code stored thereon for programming a computer to perform a method for managing a text messaging session between a caller device and multiple responding devices, the method comprising:
establishing the text messaging session, which establishes a media path for sending text messages between the caller device and a single destination device, wherein the session is established in response to a call from the caller device;
joining the multiple responding devices to the text messaging session wherein the multiple responding devices are joined in a real-time manner such that each responding device sees contents of the other responding device's text messages being typed in real time before any text message is sent to the caller device;
receiving text messages from the multiple responding devices;
applying a set of rules to the text messages received from the multiple responding devices to determine a set of text messages to send to the caller device; and
sending the set of text messages over the media path to the caller device, wherein each text message in the set of text messages is associated with the same identifier;
wherein the set of rules comprises at least one of:
a rule to send a first text message from a first responding device, and provide an indication to a second responding device that a second text message was not sent;
a rule to send a second text message from the second responding device when the second responding device has assigned an override-drop status to the second text message;
a rule to send either the first or the second text message based on a role of the first or the second responding device; or
a rule to send the first text message delay sending the second text message by a delay time interval.

16. The non-transient computer-readable storage element of claim 15, wherein the method further comprises:

receiving, in real time from a first responding device of the multiple responding devices, a first text message as it is keyed into the first responding device; and signaling the first text message in real time to a second responding device of the multiple responding devices as the first text message is keyed into the first responding device.

17. The non-transient computer-readable storage element of claim 15, wherein the method further comprises:

determining that a first responding device of the multiple responding devices has left the text messaging session and that a second responding device of the multiple responding devices was joined to the text messaging session subsequent to the first responding device being joined to the text messaging session; and sending, to the second responding device, a summary of text messages exchanged between the first responding device and the caller device.

18. The non-transient computer-readable storage element of claim 15, wherein the text messaging session between the caller device and the multiple responding devices is an emergency text messaging session established in response to an emergency call from the caller device.

* * * * *

UNITED STATES PATENT AND TRADEMARK OFFICE
CERTIFICATE OF CORRECTION

Page 1 of 1

PATENT NO. : 8,838,061 B2
APPLICATION NO. : 13/332600
DATED : September 16, 2014
INVENTOR(S) : Matthew C. Keller et al.

It is certified that error appears in the above-identified patent and that said Letters Patent is hereby corrected as shown below:

IN THE SPECIFICATION:

In Column 5, Lines 12-13, delete "network 106," and insert -- network 112, --, therefor.

In Column 5, Line 53, delete "network 106" and insert -- network 112 --, therefor.

Signed and Sealed this
Seventeenth Day of May, 2016

Michelle K. Lee
*Director of the United States Patent and Trademark Office*